(12) United States Patent
Rigg et al.

(10) Patent No.: US 8,521,736 B2
(45) Date of Patent: Aug. 27, 2013

(54) MANAGING HIERARCHIES OF COMPONENTS

(75) Inventors: Dana Rigg, Austin, TX (US); Semyon Reyfman, New York, NY (US); Mahesh Raghavan, Denville, NJ (US); Kenneth Cox, Marlborough, MA (US); Mitch Mastellone, Newton, NJ (US)

(73) Assignee: Dassault Systemes Enovia Corp., Lowell, MA (US)

( * ) Notice: Subject to any disclaimer, the term of this patent is extended or adjusted under 35 U.S.C. 154(b) by 1589 days.

(21) Appl. No.: 11/259,739

(22) Filed: Oct. 26, 2005

(65) Prior Publication Data

US 2007/0106708 A1    May 10, 2007

(51) Int. Cl.
G06F 7/00        (2006.01)
G06F 17/30       (2006.01)

(52) U.S. Cl.
USPC ..................................... 707/736; 707/829

(58) Field of Classification Search
USPC .................. 715/514, 713; 707/203, 8, 201, 707/736, 829
See application file for complete search history.

(56) References Cited

U.S. PATENT DOCUMENTS

| | | | | |
|---|---|---|---|---|
| 4,442,332 A | 4/1984 | Jackson et al. | ............. | 219/10.67 |
| 4,523,563 A | 6/1985 | Moore et al. | ................... | 123/359 |
| 4,558,413 A * | 12/1985 | Schmidt et al. | ............... | 707/203 |
| 4,605,983 A | 8/1986 | Harvey | .......................... | 361/154 |
| 4,628,885 A | 12/1986 | Ogburn et al. | ................. | 123/490 |
| 4,644,191 A | 2/1987 | Fisher et al. | .................. | 307/465 |
| 4,686,384 A | 8/1987 | Harvey et al. | .............. | 307/202.1 |
| 4,700,143 A | 10/1987 | Anthony et al. | ............... | 328/151 |
| 4,968,900 A | 11/1990 | Harvey et al. | .............. | 307/296.3 |
| 5,530,958 A | 6/1996 | Agarwal et al. | ................ | 395/403 |
| 5,623,545 A | 4/1997 | Childs et al. | ......................... | 380/2 |
| 5,678,040 A * | 10/1997 | Vasudevan et al. | ............... | 707/8 |
| 6,044,077 A | 3/2000 | Luijten et al. | ................. | 370/392 |
| 6,138,216 A | 10/2000 | Harvey | ......................... | 711/139 |
| 6,174,803 B1 | 1/2001 | Harvey | ......................... | 438/638 |
| 6,215,129 B1 | 4/2001 | Harvey et al. | .................. | 257/48 |

(Continued)

OTHER PUBLICATIONS

Katz, Randy H. "Toward a Unified Framework for Version Modeling in Engineering Databases," Dec. 1990, ACM Computing Surveys, vol. 22, No. 4.*

(Continued)

*Primary Examiner* — Marc Somers
(74) *Attorney, Agent, or Firm* — Proskauer Rose LLP

(57) ABSTRACT

Described are methods, systems, and apparatus, including computer program products for managing a hierarchy of modules. A user can select a first hierarchy or a second hierarchy, where the first hierarchy includes a module and a first sub-module. The module is associated with a component and the first sub-module is associated with a first sub-component of the component. The module is associated with the first sub-module using a first hierarchical reference of a first type. The second hierarchy includes the module and a second sub-module, where the second sub-module is associated with the first sub-component. The module is associated with the second sub-module using a second hierarchical reference of a second type that is different from the first type.

24 Claims, 11 Drawing Sheets

(56) References Cited

U.S. PATENT DOCUMENTS

| | | | |
|---|---|---|---|
| 6,236,222 B1 | 5/2001 | Sur, Jr. et al. | 324/758 |
| 6,249,039 B1 | 6/2001 | Harvey et al. | 257/531 |
| 6,269,060 B1 | 7/2001 | Harvey et al. | 369/47.28 |
| 6,397,231 B1 | 5/2002 | Salisbury et al. | 707/515 |
| 6,449,627 B1 | 9/2002 | Baer et al. | 707/514 |
| 6,665,210 B1 | 12/2003 | Harvey | 365/185.03 |
| 6,687,710 B1 | 2/2004 | Dey | 707/104.1 |
| 7,188,333 B1 * | 3/2007 | LaMotta et al. | 717/106 |
| 2001/0046197 A1 | 11/2001 | Harvey et al. | 369/59.12 |
| 2002/0019730 A1 | 2/2002 | Garner et al. | 703/14 |
| 2002/0124006 A1 | 9/2002 | Parnell et al. | 707/102 |
| 2002/0126604 A1 | 9/2002 | Powelson et al. | 369/47.53 |
| 2003/0088593 A1 | 5/2003 | Stickler | 707/205 |
| 2003/0093434 A1 | 5/2003 | Stickler | 707/103 |
| 2003/0107967 A1 | 6/2003 | Harvey et al. | 369/59.12 |
| 2003/0126136 A1 | 7/2003 | Omoigui | 707/10 |
| 2003/0200235 A1 * | 10/2003 | Choy et al. | 707/203 |
| 2003/0204537 A1 * | 10/2003 | Liang et al. | 707/203 |
| 2003/0227487 A1 | 12/2003 | Hugh | 345/777 |
| 2004/0059802 A1 | 3/2004 | Jacquemot et al. | 709/220 |
| 2004/0093323 A1 | 5/2004 | Bluhm et al. | 707/3 |
| 2004/0168153 A1 | 8/2004 | Marvin | 717/120 |
| 2004/0216048 A1 | 10/2004 | Brown et al. | 715/530 |
| 2004/0268339 A1 | 12/2004 | Van Someren et al. | 717/172 |
| 2005/0027979 A1 | 2/2005 | Peck et al. | 713/161 |
| 2005/0044351 A1 | 2/2005 | Harvey | 713/153 |
| 2005/0080502 A1 | 4/2005 | Chernyak et al. | 700/97 |
| 2005/0108667 A1 | 5/2005 | Iadanza et al. | 716/4 |

OTHER PUBLICATIONS

Ecklund, D. Ecklund, E. Eifrig, R. Tonge, F. "DVSS: A Distributed Version Storage Server for CAD Applications," 1987, Proceedings of the 13th VLDB Conference.*

Sciore, Edward. "Versioning and Configuration Management in an Object-Oriented Data Model," 1994, VLDB Journal, vol. 3, p. 77-106.*

Katz, R. et al., "Version Modeling Concepts for Computer-Aided Design Databases," Report No. UCB/CSD 86/270, University of California, Computer Science Division, Nov. 1985, pp. 1-21.

Al-Khudair, A., et al. "Dynamic Evolution and Consistency of Collaborative Configurations in Object-Oriented Databases," 39$^{th}$ International Conference and Exhibition on Technology of Object-Oriented Languages and Systems, 2001, pp. 207-218.

Katz, R.H. et al., "A Version Server for Computer-Aided Design Data," 23$^{rd}$ Conference on Design Automation, 1986, pp. 27-33.

Lambrix, P., "Aspects of Version Management of Composite Objects," Thesis, Department of Computer and Information Science, Linköping, Sweden, 1992, pp. 1-71.

Ahmed, R., "Version Management of Composite Objects in CAD Databases," ACM SIGMOD Record, vol. 20, Issue 2, 1991, pp. 218-227.

International Search Report from the International Searching Authority, mailed May 11, 2007.

International Written Opinion from the International Searching Authority, mailed May 11, 2007.

* cited by examiner

MANAGING HIERARCHIES OF COMPONENTS

FIELD OF THE INVENTION

The present invention relates generally to managing hierarchies of modules.

BACKGROUND

When designing and developing large integrated systems, circuits in particular, typically no one team of engineers is responsible for the entire design of the system. Instead, often teams of engineers are responsible for designs of components of the system, the overall design being the totality of the designs of the components provided by each team of engineers. As the system becomes more complex, more and more aspects of the system are divided into components and/or sub-components of the components, and the granularity of the constituent parts becomes finer, i.e., the system is composed of components, which are in turn composed of sub-components, which in turn are composed of sub-components of their own and so on. This system composed of components, which in turn include sub-components, and so forth, form a hierarchy of components. Changes to a sub-component affects the sub-component's parent component, which, in turn, affects the component's parent system. Changes to a component or to its sub-components also affects any sibling component that accesses the component or the component's sub-components.

Coordinating the work of dozens or possibly hundreds of workers is difficult. The components of the system may be software, simulated hardware, and/or products. A team working on a particular component, as they experiment, may introduce anomalies into the overall system because other components depend on the component being actively developed. Version control systems have been implemented to track these changes, allowing developers the ability to undo a change or several changes to a component, thus putting the system back into a state that was stable at an earlier time. Some examples of version control software are the open source Concurrent Versioning System (CVS) project, Visual SourceSafe® software produced by Microsoft® Corporation of Redmond, WA, and the Hierarchical Management System developed by MatrixOne® Corporation of Maynard, MA which is for Product Lifecycle Management ("PLM").

Typically, an engineering team using existing version control software is only capable of saving a new design in its totality. Therefore, if, at a later time, the design team wishes to retrieve a previous design, the previous design is provided in its entirety. By only providing access to entire designs of components, existing software limits an engineering team's ability to use more recent components of the design, and therefore reduces their efficiency.

SUMMARY OF THE INVENTION

One approach to multi-team development of a hierarchy of components and subcomponents is to utilize different types of hierarchical references for managing hierarchies of modules. In one aspect, there is a method. The method involves managing a hierarchy of modules. The method involves enabling a user to select a first hierarchy or a second hierarchy. The first hierarchy includes a module and a first sub-module. The module is associated with a component. The first sub-module is associated with a first sub-component of the component. The module is associated with the first sub-module using a first hierarchical reference of a first type. The second hierarchy includes the module and a second sub-module. The second sub-module is associated with the first sub-component. The module is associated with the second sub-module using a second hierarchical reference of a second type different from the first type.

In another aspect, there is a system for managing a hierarchy of modules. The system includes a database. The database includes a first hierarchy of modules and a second hierarchy of modules. The first hierarchy includes a module and a first sub-module. The module is associated with a component. The first sub-module is associated with a first sub-component of the component. The module is associated with the first sub-module using a first hierarchical reference of a first type. The second hierarchy includes the module and a second sub-module. The second sub-module is associated with the first sub-component. The module is associated with the second sub-module using a second hierarchical reference of a second type different from the first type. The database is adapted to receive a request from a client over a network for selecting the first or the second hierarchy of modules. The database is adapted to transfer the first or the second hierarchy of modules to the client over the network based on the request.

In another aspect, there is a computer program product. The computer program product is tangibly embodied in an information carrier, the computer program product including instructions being operable to cause a data processing apparatus to enable a user to select a first hierarchy or a second hierarchy of modules. The first hierarchy includes a module and a first sub-module. The module is associated with a component. The first sub-module is associated with a first sub-component of the component. The module is associated with the first sub-module using a first hierarchical reference of a first type. The second hierarchy includes the module and a second sub-module. The second sub-module is associated with the first sub-component. The module is associated with the second sub-module using a second hierarchical reference of a second type different from the first type.

In other examples, any of the aspects above can include one or more of the following features. In some embodiments, the first and the second sub-modules are the same. In some embodiments, the first and the second sub-modules are different. In some embodiments, the first type of the first hierarchical reference includes a static type and the second type of the second hierarchical reference includes a dynamic type. In some embodiments, the first hierarchical reference has a fixed association with the first sub-module. In some embodiments, the fixed association is with a particular version number of the component. In some embodiments, the second hierarchical reference has a changeable association with the second sub-module. In some embodiments, the changeable association is with a changeable tag. In some embodiments, the changeable tag is associated with the second sub-module. In some embodiments, the changeable tag is associated with a branch. The branch includes the first and the second sub-module. In some embodiments, the first and the second sub-modules are different. The first sub-module is created at a time earlier than the second sub-module. In some embodiments, the changeable association is with a branch. The branch includes the second sub-module. In some embodiments, the first and the second sub-modules are different. The first sub-module is created at a time earlier than the second sub-module.

In some embodiments, an input indicative of a static version of the module can be received, and providing the first hierarchy can be based on the input. In some embodiments, the first hierarchy further includes a static version of the first sub-module. In some embodiments, the first hierarchy further includes a static version of the first sub-module and a static version of a third sub-module. The third sub-module is associated with a second sub-component different from the first sub-component. The module is associated with the third sub-module using a third hierarchical reference of a static or a dynamic type.

In some embodiments, an input indicative of a dynamic version of the module can be received, and providing the second hierarchy can be based on the input. In some embodiments, the second hierarchy further includes a dynamic version of the second sub-module. The second hierarchy further includes a dynamic version of the second sub-module and a dynamic version of a third sub-module. The third sub-module is associated with a second sub-component different from the first sub-component. The module is associated with the third sub-module using a third hierarchical reference of a static or a dynamic type.

In some embodiments, the second hierarchy further includes a third sub-module. The third sub-module is associated with a second sub-component different from the first sub-component. The module is associated with the third sub-module using a third hierarchical reference of a third type. The method involves receiving an input indicative of a hybrid version of the module, and providing the second hierarchy based on the input. The second hierarchy further includes a dynamic version of the second sub-module and a version of the third type of the third sub-module. In some embodiments, the third type is a static type or a dynamic type. In some embodiments, the module includes files, data, and/or source code.

Any of the above implementations can realize one or more of the following advantages. By automatically defining a static hierarchical reference at the time a dynamic hierarchical reference is created, a design team in the future can advantageously use this static hierarchical reference for determining the initial association of the dynamic hierarchical reference, even when the dynamic hierarchical reference points to subsequent versioned modules. In addition, the design team only needs to ask for a version of a module, wherein hierarchical referencing advantageously removes the need for the design team to manually ask for every sub-module, which can number in the thousands, of the module being downloaded to work on. In addition, the design team can commit changes to all modules in a hierarchy with a single request, removing the need to manually redefine the hierarchy to refer to the new versions of each module. In addition, the design team can determine what portions of a dynamic or hybrid hierarchy are out-of-date with a single request. In addition, entire hierarchies can be compared with each other.

Other aspects and advantages of the present invention will become apparent from the following detailed description, taken in conjunction with the accompanying drawings, illustrating the principles of the invention by way of example only.

BRIEF DESCRIPTION OF THE DRAWINGS

The foregoing and other objects, features, and advantages of the present invention, as well as the invention itself, will be more fully understood from the following description of various embodiments, when read together with the accompanying drawings, in which.

DETAILED DESCRIPTION

The development of hardware or software systems that are made up of several components can be made more efficient when the design of the system is divided into smaller and more manageable designs of components of the system. The division of the design of the system can be facilitated by a hierarchical representation.

Figure 1:
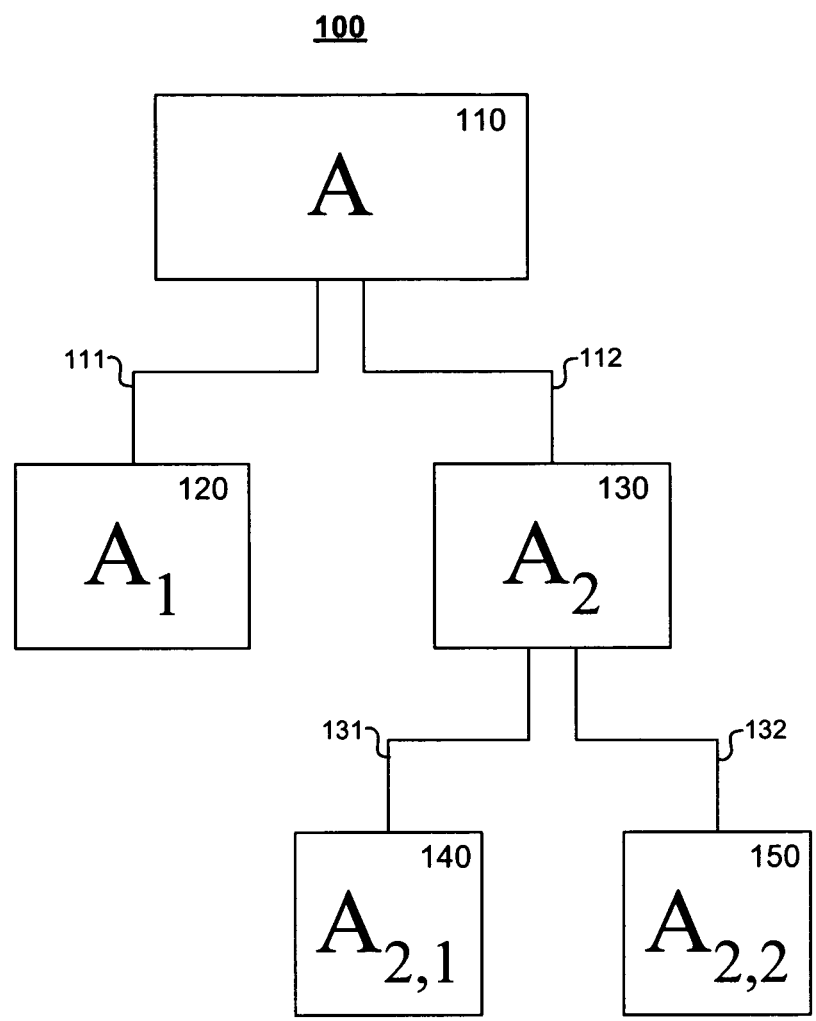
FIG. 1 is a hierarchical representation of a product.

FIG. 1 illustrates an example of a hierarchical representation 100 of a product A 110. The product A 110 includes a first component $A_1$ 120 and a second component $A_2$ 130. The second component $A_2$ 130 includes two sub-components $A_{2,1}$ 140 and $A_{2,2}$ 150. The product A 110 has hierarchical associations 111 and 112, respectively, with components $A_1$ 120 and $A_2$ 130. Likewise, the component $A_2$ 130 has hierarchical associations 131 and 132, respectively, with sub-components $A_{2,1}$ 140 and $A_{2,2}$ 150. The product A 110 can include further components (not shown), which can, in turn, include further sub-components. Sub-components can also include further sub-components and so forth.

Hierarchical representations, such as 100, can also be formulated separately for components or sub-components of the product A 110 (e.g., representations that are subsets of the complete hierarchical representations 100 of the product A 110). In addition, while in this embodiment the element A 110 is a product, the element A 110 can also be considered as a component, wherein the element $A_1$ 120 and the element $A_2$ 130 can be considered as sub-components of the element A 110. Likewise, the element $A_{2,1}$ 140 and the element $A_{2,2}$ 150 can be considered as components, with hierarchical relationships to their sub-components (not shown).

The product A 110 can be representative of any hardware or software system that can be designed in a modular fashion. For example, the product A 110 can be a car, wherein the component $A_1$ 120 can be the frame and the component $A_2$ 130 can be the engine of the car. The sub-components $A_{2,1}$ 140 and $A_{2,2}$ 150 of the engine can be, for example, a crankshaft and a cylinder, respectively, of the engine. In another example, the product A 110 can be an integrated circuit (IC) chip, wherein the component $A_1$ 120 can be the random access memory (RAM) and the component $A_2$ 130 can be the computer processing unit (CPU) of the IC chip. The sub-components $A_{2,1}$ 140 and $A_{2,2}$ 150 of the CPU can be, for example, an arithmetic logic unit (ALU) and a control unit, respectively, of the CPU.

During the development process, a design team for a particular component can have access to all current and prior designs of the component and/or sub-components of the component. A design team can be responsible for a component at any level on the hierarchical representation 100. For example, a design team can exist for development of the product A 110, as well as separate design teams for each of the product A's 110 components (e.g., the components $A_1$ 120 and $A_2$ 130). The design team for the product A 110 can be responsible for simulating and/or testing the product A 110 using particular designs of the components of product A 110.

Designs for the product A 110 and all of its components, $A_1$ 120 and $A_2$ 130, and sub-components, $A_{2,1}$ 140 and $A_{2,2}$ 150, can be included as files in modules that are stored in a central database (e.g., database 1021) or a distributed database for retrieval by any of the design teams (e.g., at client-stations 1030 or 1040). A module typically includes one or more files including software code and/or design data. Modules can contain other modules and they can be released and even packaged for re-use. In some implementations, a server-side database is used, for example MatrixOne® Business Objects by MatrixOne®, Inc. of Westford, MA, although other databases or combinations of databases can of course be used.

Figure 2:
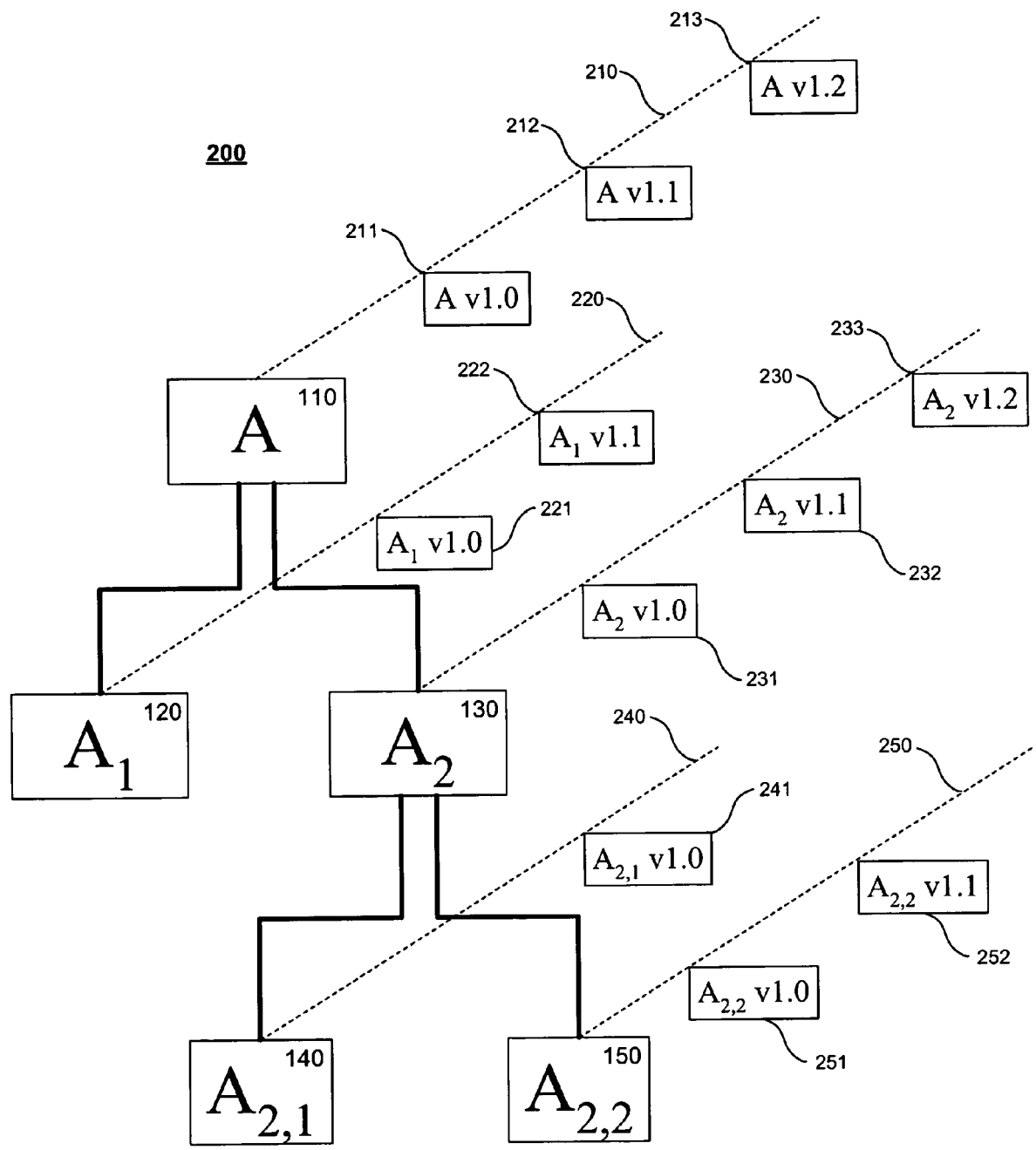
FIG. 2 is a block diagram of versioned modules associated with a hierarchy of components.

To help facilitate and track the development of a component, each design of the component, which is stored in a module, can have a specific version number associated with that module, e.g., a module version. FIG. 2 illustrates a block diagram 200 of versioned modules associated with specific components, using the same hierarchy of components as illustrated in FIG. 1. The product A 110 can be associated with multiple modules with different module version numbers, e.g., modules A v1.0 211, A v1.1 212, and A v1.2 213.

The diagram 200 includes module branches 210, 220, 230, 240, and 250. A module branch represents the chronological progression of updates to a collection of objects that have a common association with a particular product, component, or sub-component. For example, the collection of modules A v1.0 211, A v1.1 212, and A v1.2 213 included or referenced by the module branch 210 are different versioned modules of the product A 110 that each represent a subsequent update or change to the antecedent versioned module. The module branch 220 refers to the collection of modules $A_1$ v1.0 221, and $A_1$ v1.1 222 that are different versioned modules associated with the component $A_1$ 120. The module branch 230 refers to the collection of modules $A_2$ v1.0 231, $A_2$ v1.1 232, and $A_2$ v1.2 233 that are different versioned modules associated with the component $A_2$ 130. The module branch 240 refers to the collection of module $A_{2,1}$ v1.0 241 associated with the sub-component $A_{2,1}$ 140. The module branch 250 refers to the collection of modules $A_{2,2}$ v1.0 251, and $A_{2,2}$ v1.1 252 that are different versioned modules associated with the sub-component $A_{2,2}$ 150.

A versioned module (e.g., the modules A v1.0 211, A v1.1 212, and A v1.2 213) conveys that the module was updated or changed at a specific point in time of a chronological progression of updates or changes to the design of the component (e.g., the product A 110). Any change to a component design from one module by one of the design teams can result in the creation of a new module with a new module version number. For example, the design team for the component $A_2$ 130 makes a change to the design of version 1.1 included in module $A_2$ v1.1 232 and creates module $A_2$ v1.2 233 with new version number 1.2 to save the new design. A particular component (e.g., the component $A_2$ 130) can have multiple design versions, each stored in separate modules (e.g., the modules $A_2$ v1.0 231, $A_2$ v1.1 232, and $A_2$ v1.2 233) with different version numbers (e.g., v1.0, v1.1, and v1.2).

Figure 3:
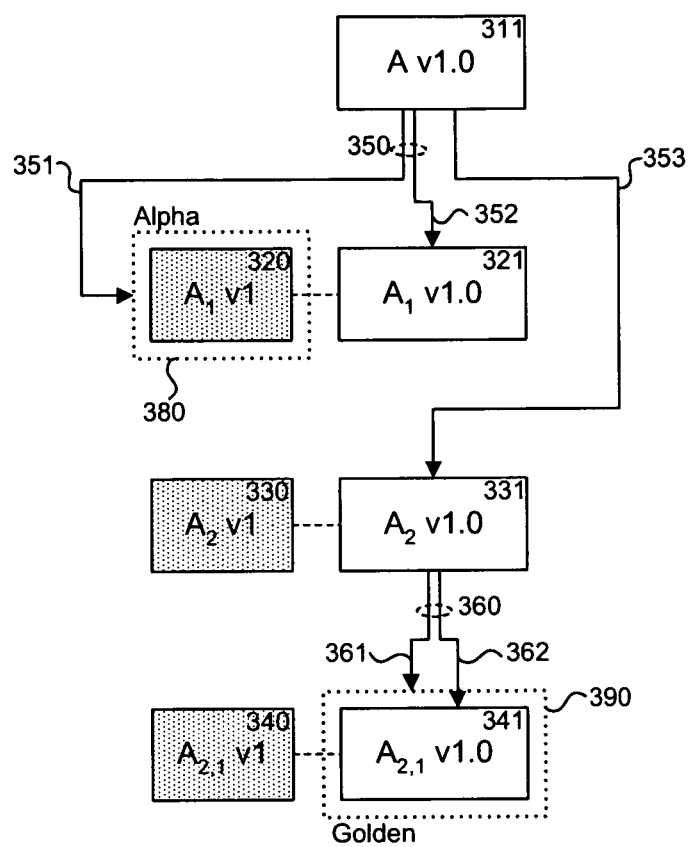
FIG. 3 is a representation of the contents of a database.
Figure 4:
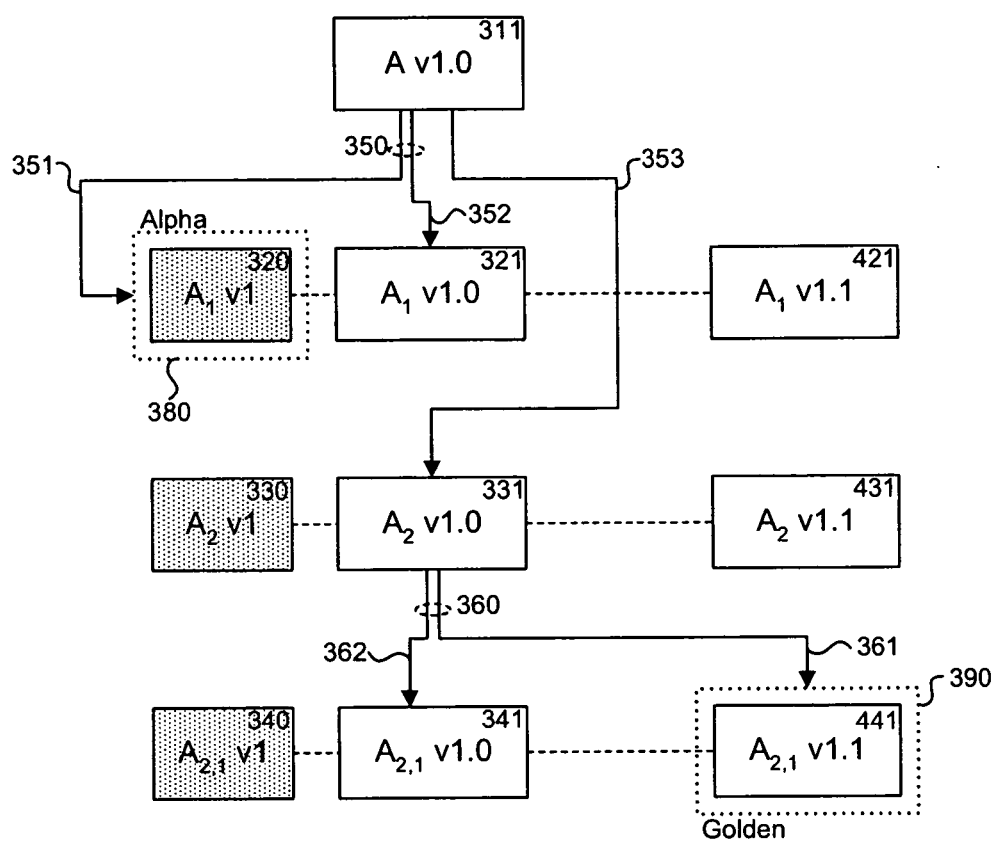
FIG. 4 is a representation of the contents of a database.

To further facilitate the development of a product or component, one or more hierarchical references can be stored in a component's modules that refer to particular sub-modules. FIGS. 3 and 4 illustrate examples of the different types of hierarchical references that can exist and change from time $t_1$ to $t_2$ between the module of a particular design of a product and the sub-modules associated with components of that product. FIGS. 3 and 4 use a portion of the hierarchical representation 100, wherein the product A 110 includes the two components, $A_1$ 120 and $A_2$ 130, and the component $A_2$ includes one sub-component $A_{2,1}$ 140. A sub-module can be any module that has been referenced by another module and associates with a sub-component of the component associated with the module. For example, in FIG. 3 modules $A_1$ v1.0 321 and $A_2$ v1.0 331 are sub-modules of the module A v1.0 311, and module $A_{2,1}$ v1.0 341 is a sub-module of the module $A_2$ v1.0 331. The module A v1.0 311 is associated with component A 110 and the sub-modules $A_1$ v1.0 321 and $A_2$ v1.0 331 are associated with sub-components $A_1$ 120 and $A_2$ 130, respectively.

FIG. 3 can be viewed as a snapshot 300 at time $t_1$ of the contents of a database (e.g., database 1021) storing the modules for the product A 110. The module A v1.0 311 includes version 1.0 of a design of the product A 110. Modules $A_1$ v1.0 321 and $A_2$ v1.0 331, respectively, include versions 1.0 of designs of the components $A_1$ 120 and $A_2$ 130. The module $A_{2,1}$ v1.0 341 includes version 1.0 of a design of the sub-component $A_{2,1}$ 140. A module branch 320 refers to the chronological progression of the modules associated with the component $A_1$ 120 and includes or refers to, at time $t_1$, the module $A_1$ v1.0 321. A module branch 330 refers to the chronological progression of the modules for the component $A_2$ 130 and includes or refers to, at time $t_1$, the module $A_2$ v1.0 331. A module branch 340 refers to the chronological progression of the modules for the sub-component $A_{2,1}$ 140 and includes or refers to, at time $t_1$, the module $A_{2,1}$ v1.0 341.

Figure 5:
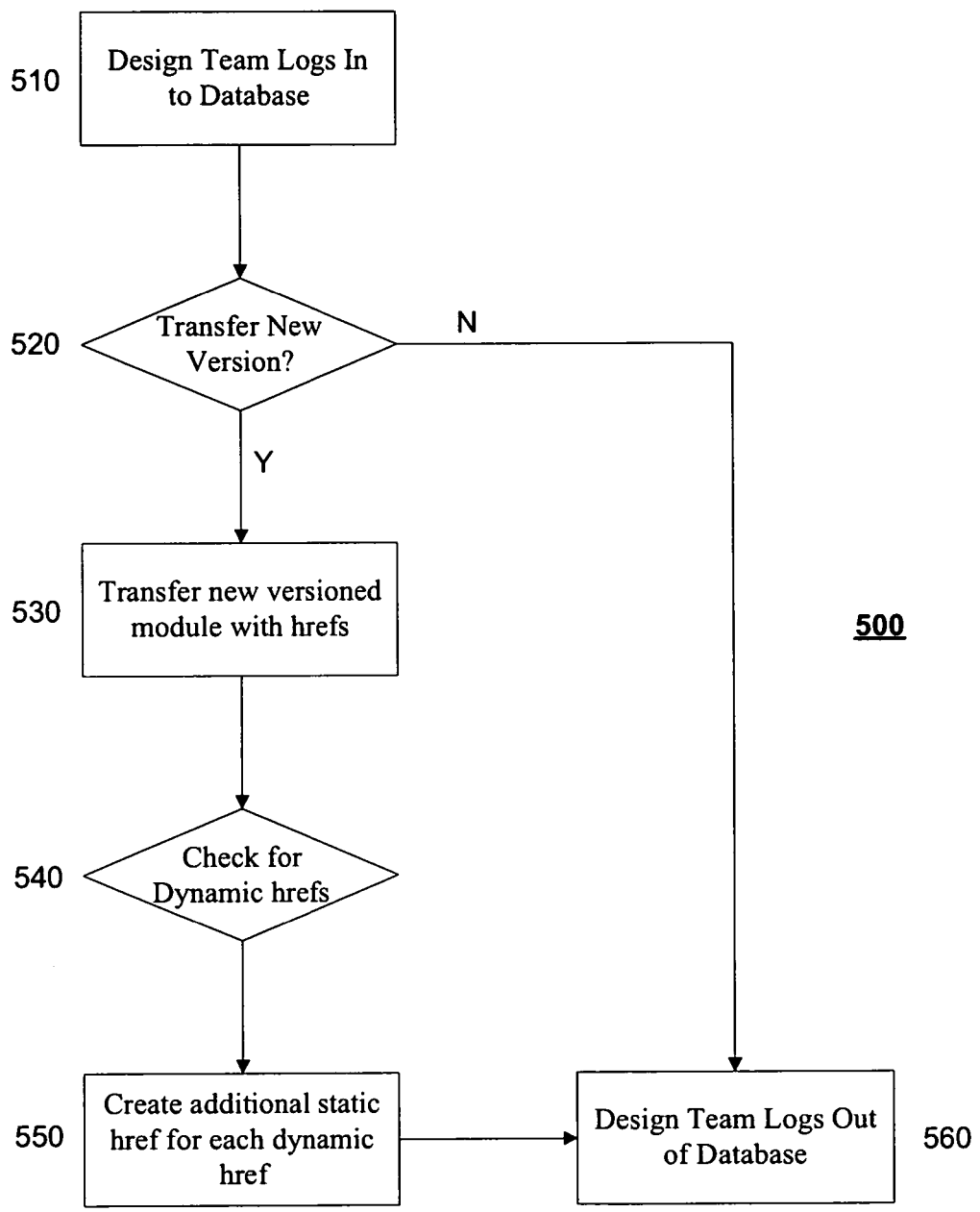
FIG. 5 is a flowchart depicting a method for uploading a module to a database.

Time $t_1$ can be, for example, the time at which the design team for the product A 110 first transfers the module A v1.0 311 to the database. The module A v1.0 311 includes the first design of the product A 110, which is assigned version number 1.0. The design team at or before this time defines a dynamic hierarchical reference 351 to the "alpha" tag 380 and a static hierarchical reference 353 to the module $A_2$ v1.0 331. FIG. 5 is a flowchart 500 illustrating the process of transferring a module (e.g., the module $A_2$ v1.0 331) to a database. The design team logs in to the database (510). The design team decides if they want to transfer a new version of a module to the database (520). For example, the design time can enter at their computer prompt the command:

prompt: put -module Chip -path MyModules -server sync://abc.com

Here, the design team requests to transfer the module "Chip" to the directory "MyModules" on the server "abc.com." The new module is transferred, along with any defined hierarchical references that reference sub-modules of the module (530). The database checks the type of all of the hierarchical references included in the transferred module (540). For each hierarchical reference included in the transferred module that is of the dynamic type, which is one that can change and refer to a different module at a later time, the database creates an additional static hierarchical reference, which is one that does not change, associated with each dynamic hierarchical reference. The additional static hierarchical reference refers to the sub-module referred to by the dynamic hierarchical reference when the static hierarchical reference is created (550). The design team logs out of the database (560).

When a dynamic hierarchical reference is defined (e.g., hierarchical reference 351) in a module being transferred, the database can automatically define an additional hierarchical reference of a static type that points to the module that the dynamic hierarchical reference initially refers to at the time the module is committed to the database (550). In this embodiment, the database performs process 550 at the time the module is committed, but other configurations can also be used, e.g., a server 1020 on the side of the database 1021 or a computer, 1030 or 1040, on the design team's side (e.g., a local storage 1031 or 1041) can perform process 550 at the time the module is created or saved. In some embodiments, the system always defines a static hierarchical reference when a dynamic hierarchical reference is defined, advantageously guaranteeing that both a dynamic and static hierarchy are available for selection by a user.

In the example of FIG. 3, a static hierarchical reference 352 is created that points to the module $A_1$ v1.0 321, which, as described below, is the module that the "alpha" tag 380 refers to at time $t_1$. Therefore, initially the hierarchical references 351 and 352, grouped as 350, both refer to the same module though they point to different objects. By automatically defining a static hierarchical reference at the time a dynamic hierarchical reference is created, a design team in the future can advantageously use this static hierarchical reference for determining the initial association of the dynamic hierarchical reference, even when the dynamic hierarchical reference points to subsequent versioned modules.

In a similar fashion, a dynamic hierarchical reference 361 for the module $A_2$ v1.0 331 is created by the design team for the component $A_2$ at or before the time this design team transfers or commits the module $A_2$ v1.0 331 to the database. In this example, the design team for the component $A_2$ defines the dynamic hierarchical reference 361 to point to the "golden" tag 390. The golden tag 390 initially points to module $A_{2,1}$ V1.0 341. A static hierarchical reference 362 is automatically defined, at process 550, to point to the same module that the dynamic hierarchical reference 361 initially points to, which is module $A_{2,1}$ v1.0 341. Initially, the hierarchical references 361 and 362, grouped as 360, both refer to the same module though they point to different objects.

In the illustrated example of FIG. 3, hierarchical references for a module associated with a component are created at the time the module is committed to the database. However, hierarchical references stored in a module can be added, deleted, or changed at anytime after the module has been committed.

At a time between $t_1$ and $t_2$, the design teams for the components $A_1$ 120, $A_2$ 130, and $A_{2,1}$ 140, respectively, transfer new modules $A_1$ v1.1 421, $A_2$ v1.1 431, and $A_{2,1}$ v1.1 441 according to the flowchart 500. In addition, the design team for the component $A_{2,1}$ 140 moves the "golden" tag 390 from the module $A_{2,1}$ v1.0 341 to the module $A_{2,1}$ v1.1 441. FIG. 4 can be viewed as a snapshot 400 of the contents of the database at the later time $t_2$.

Generally, hierarchical references can be dynamic or static. A static hierarchical reference (e.g., hierarchical references 352, 353, and 362) refers to a module including a particular version of a component or sub-component. For example, the static hierarchical reference 352 refers to module $A_1$ v1.0 321, which includes version 1.0 of the design of component $A_1$ 120. On the other hand, a dynamic hierarchical reference (e.g., hierarchical references 351 and 361) can refer to a tag or to a module branch, which then refers to a particular module. Tags and module branches can change, thus the module that the dynamic hierarchical reference ultimately refers to can change. A tag can be manually changed by a user to refer to a different module. For example, the design team for the component $A_{2,1}$ 140 moves the "Golden" tag 390 from the module $A_{2,1}$ v1.0 341 to the module $A_{2,1}$ v1.1 441. A module branch can be changed by adding a new module (e.g., a new module version) to the module branch. For example, when the design team for component $A_1$ 120 transfers the new module $A_1$ v1.1 421 to the database, the module branch 320 changes such that it additionally includes or refers to the new module $A_1$ v1.1 421 (e.g., the module branch points to the latest version).

Tags of different types can be defined. For example, the most recent module of any component can be associated with an "alpha" tag, which can represent an "in-process" version of the component. In the example illustrated in FIG. 3, by defining an "alpha" tag 380 to refer to the branch 320, the "alpha" tag 380 refers to the module with the most recent version that the module branch 320 refers to or includes. In an alternative embodiment, the dynamic hierarchical reference 351 can point to the module branch 320 directly and the same result would apply. In another example (not illustrated), a module of a component can be tagged as "beta," which can represent a "testing" version of the component. A module of a component can also be tagged as "golden," which can represent the latest "stable" version of the component. In the example illustrated in FIG. 3, the design team for the component $A_{2,1}$ 140 initially defines version 1.0 of the component $A_{2,1}$ 140 as the "golden" version. Each of the "alpha", "beta", and "golden" tags are dynamic, because they are changeable (e.g., a design group can change the tag to point to a different versioned module) and thus do not always refer to the same module over time.

Figure 6A:
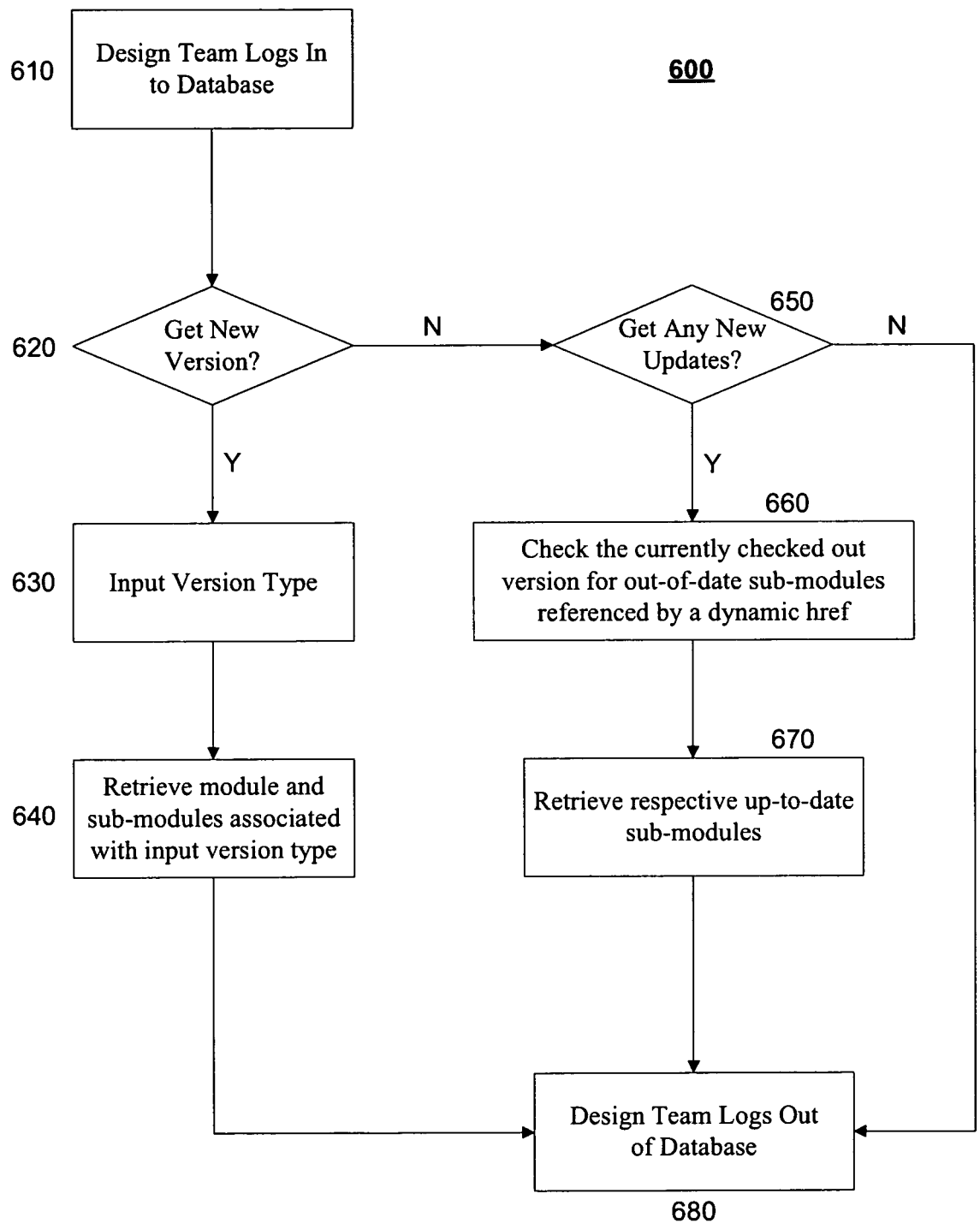
FIGS. 6A-6B are flowcharts depicting a method for downloading a hierarchy of modules from a database.
Figure 6B:
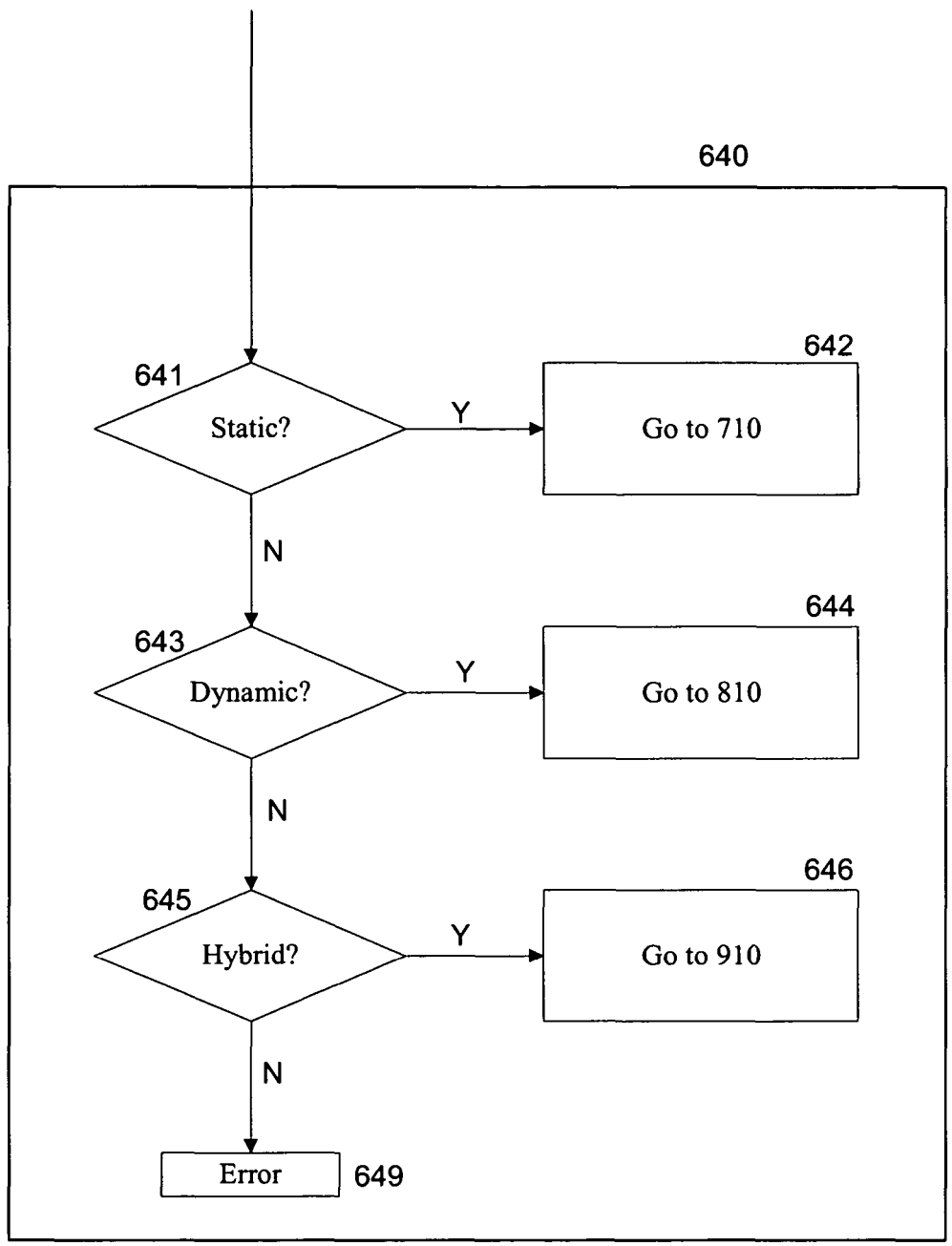

FIG. 6A is a flowchart 600 illustrating the process of downloading a module (e.g., the module $A_2$ v1.0 331) from a database. The design team logs in to the database (610). The design team decides if they want to download a module from the database (620). If yes, the design team indicates what hierarchical version of the module is being requested (630). As described below, the design team can ask for a static version, a dynamic version, or a hybrid version of a module. The input indicative of the hierarchical version of the module is used by the database to select between multiple hierarchical references, if they exist, in order to retrieve the sub-modules of a particular component (640). Process 640 is illustrated in FIG. 6B. Referring to FIG. 6B, if the input is indicative of a static hierarchy (640), the database goes to process 710 (640). If the input is indicative of a dynamic hierarchy (643), the database goes to process 810 (644). If the input is indicative of a hybrid hierarchy (645), the database goes to process 910 (646). If the input is not indicative of a recognizable option, the database returns an error message to the design team (649). Referring back to FIG. 6A, after the hierarchy is retrieved by the database and provided to the design team, the design team logs out of the database (680).

As illustrated at process 630, the design team only needs to ask for a version of a module and the hierarchical referencing advantageously removes the need for the design team to manually ask for every sub-module, which can number in the thousands, of the module being downloaded to work on. For example, when the design team downloads a module (e.g., the module A v1.0 311) associated with a component (e.g., the product A 110), the hierarchical references stored in that module can point to particular sub-modules associated with the sub-components of that component (e.g., hierarchical references 351 and 353 point to the sub-modules $A_1$ v1.0 321 and $A_2$ v1.0 331, respectively, at time $t_1$) and allow the database to automatically locate and transfer those sub-modules to the design team. The same principle applies for retrieving hierarchies of a selected sub-module (e.g., the hierarchy of the module $A_2$ v1.0 331 includes, at time $t_2$, either the sub-module $A_{2,1}$ v1.0 341 or the sub-module $A_{2,1}$ v1.1 441). When multiple hierarchical references exist that refer to modules associated with the same sub-component, only one of the hierarchical references can be chosen, because the design team only requires one design for any particular sub-component. For example, the group 350 of hierarchical references refer to the same modules associated with the same component, $A_1$ 120, and therefore only one of the hierarchical references in the group 350 is chosen.

The selection of which hierarchical reference to choose is decided upon by the design team, at process 630, by requesting a particular hierarchical version of the module being downloaded. A design team can have the option of requesting a static hierarchy, a dynamic hierarchy, or a hybrid hierarchy of a particular module. For example, the design time can enter at their computer prompt the command:
prompt:
    get -module Chip1.1 -vrsn Static -path MyModules -server sync://abc.com Here, the design team requests to download the static version of the module "Chip v1.1" from the directory "MyModules" on the server "abc.com." Likewise, the design team can also request a dynamic version or a hybrid version of the module "Chip v1.1" by, respectively, entering the following commands:

```
prompt:
    get -module Chip1.1 -vrsn Dynamic -path MyModules -server
    sync://abc.com
prompt:
    get -module Chip1.1 -vrsn Hybrid -path MyModules -server
    sync://abc.com
```

Figure 7:
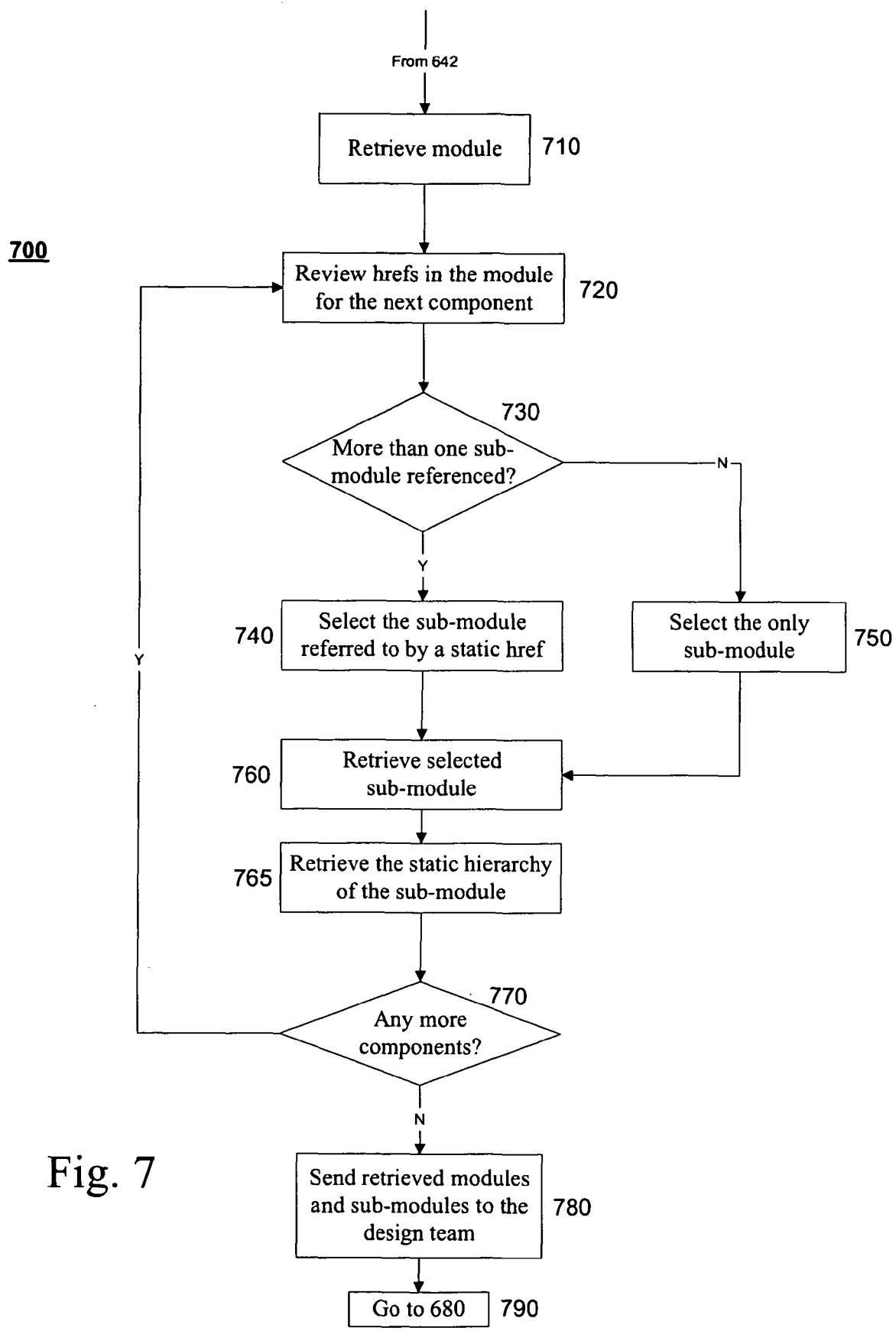
FIG. 7 is a flowchart depicting a method for selecting and retrieving a static hierarchy of a module.
Figure 8:
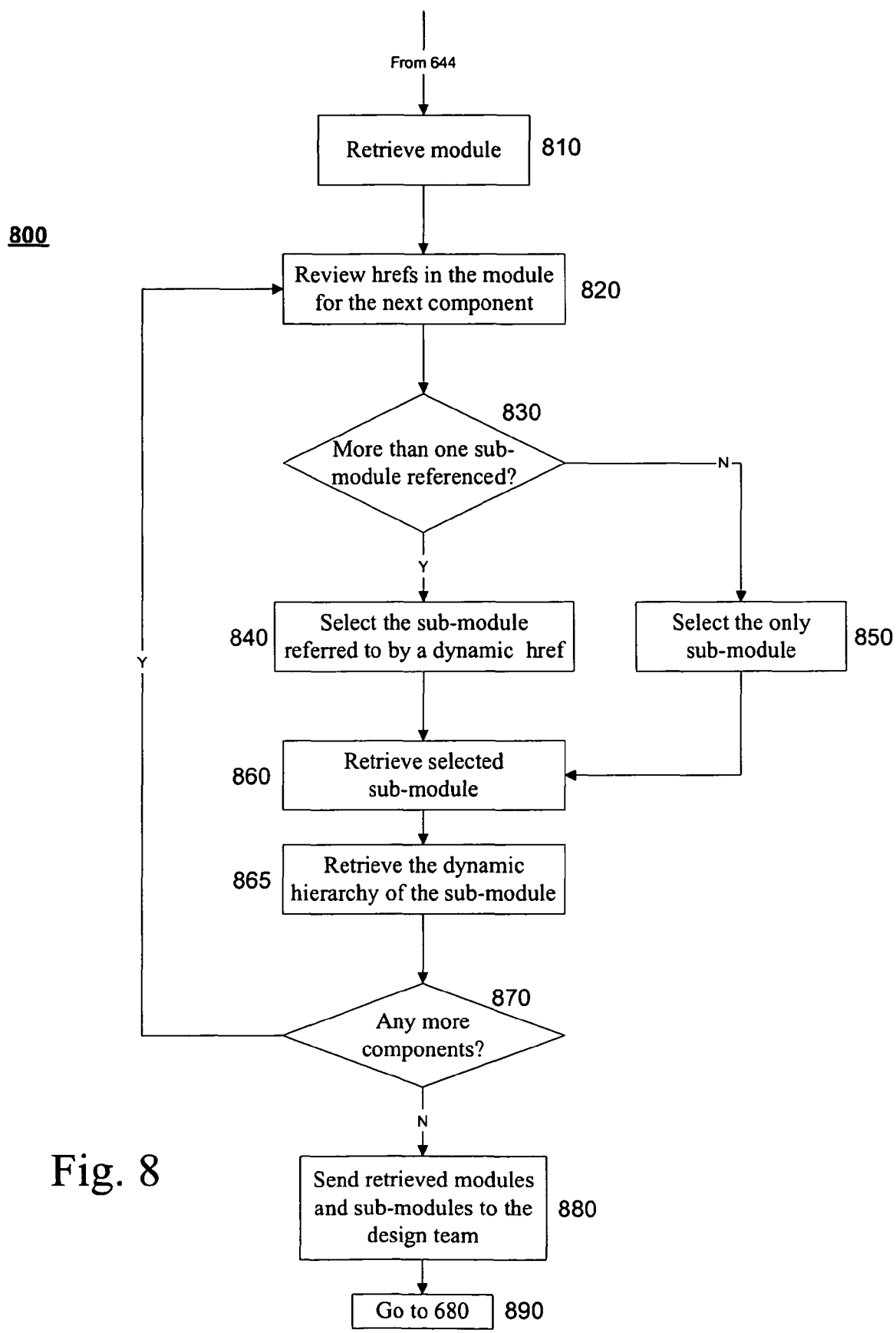
FIG. 8 is a flowchart depicting a method for selecting and retrieving a dynamic hierarchy of a module.

FIGS. 7 and 8 are flowcharts 700 and 800 illustrating the selection process for retrieving, respectively, a requested static hierarchy and a requested dynamic hierarchy. If the design team at process 630 inputs a request for a static version of their module (e.g., a static hierarchy), the database proceeds to process 710. Referring to FIG. 7, the module associated with the component that the design team is working on is retrieved (710). The database selects and retrieves one sub-module for each sub-component of the component to which the module is associated with (720 to 770). For each sub-component, the database checks for any hierarchical references included in the module that point to any sub-modules associated with that sub-component (720). The database determines if more than one hierarchical reference refers to any sub-module associated with that sub-component (730). For example, as illustrated in FIG. 4, the static hierarchical reference 362 refers to sub-module 341 and the dynamic hierarchical reference 361 refers to sub-module 441, wherein both sub-modules 341 and 441 are associated with the same sub-component 340. If more than one hierarchical reference exists, then the database selects the sub-module referred to by the static hierarchical reference (740). If only one hierarchical reference exists, then the database selects the sub-module referred to by this hierarchical reference, regardless of its type (750).

The database retrieves the sub-module referred to by the selected hierarchical reference (760). The database checks whether a sub-module has been retrieved for each of the sub-components of the component (770). If not, the procedure repeats itself beginning at process 720, until a sub-module for every sub-component has been retrieved. For each retrieved sub-module, if the sub-module contains hierarchical references, then the database separately retrieves the static hierarchy of the sub-module using processes 720 to 770 (765). The database transfers or provides to the design team the static version of the module, which includes the static hierarchy including all of the retrieved modules (780). The design team logs out of the database (790).

If the design team at process 630 selects a dynamic version of their module (e.g., a dynamic hierarchy), the database begins at process 810. Referring to FIG. 8, the module associated with the component that the design team is working on is retrieved (810). The database selects and retrieves one sub-module for each sub-component of the component to which the module is associated with (820 to 870). For each sub-component, the database checks for any hierarchical references included in the module that point to any sub-modules associated with that sub-component (820). The database determines if more than one hierarchical reference refers to any sub-module associated with that sub-component (830). If more than one hierarchical reference exists, then the database selects the sub-module referred to by the dynamic hierarchical reference (840). If only one hierarchical reference exists, then the database selects the sub-module referred to by this hierarchical reference, regardless of its type (850).

The database retrieves the sub-module referred to by the selected hierarchical reference (860). The database checks whether a sub-module has been retrieved for each of the sub-components of the component (870). If not, the procedure repeats itself beginning at process 820, until a sub-module for every sub-component has been retrieved. For each retrieved sub-module, if the sub-module contains hierarchical references, then the database separately retrieves the dynamic hierarchy of the sub-module using processes 820 to 870 (865). The database transfers or provides to the design team the dynamic version of the module, which includes the dynamic hierarchy including all of the retrieved modules (880). The design team logs out of the database (890).

Figure 9:
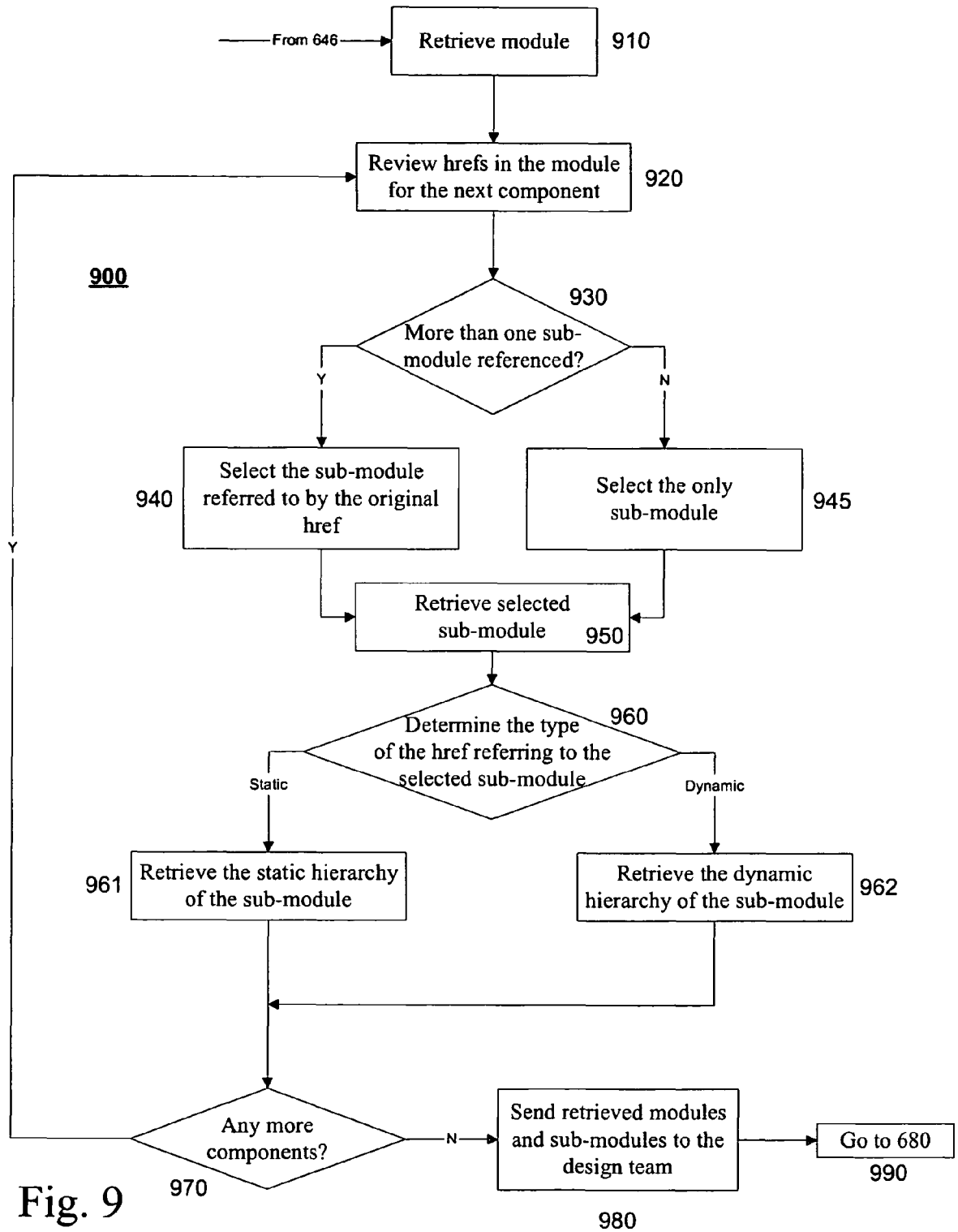
FIG. 9 is a flowchart depicting a method for selecting and retrieving a hybrid hierarchy of a module.

FIG. 9 is a flowchart 900 illustrating the selection process for retrieving a requested hybrid hierarchy. If the design team at process 630 selects a hybrid version of their module (e.g., a hybrid hierarchy), the database begins at process 910. The module associated with the component that the design team is working on is retrieved (910). The database selects and retrieves one sub-module for each sub-component of the component to which the module is associated with (920 to 970). For each sub-component, the database checks for any hierarchical references included in the module that point to any sub-modules associated with that sub-component (920). The database determines if more than one hierarchical reference refers to any sub-module associated with that sub-component (930). If more than one hierarchical reference exists, then the database selects the sub-module referred to by the hierarchical reference that was originally defined for the module (940). For example, in the group 350 of hierarchical references 351 and 352, the dynamic hierarchical reference 351 is the original hierarchical reference. So, in this example, the database selects the module referred to by the dynamic hierarchical reference 351. At time $t_2$, for example, this module would be $A_1$ v1.1 421. If only one hierarchical reference exists, then the database selects the sub-module referred to by this hierarchical reference, regardless of its type (945).

The database retrieves the sub-module referred to by the selected hierarchical reference (950). For each retrieved sub-module, the database determines the type of the hierarchical reference that was used to selected the module at processes 940 or 945 (960). If the hierarchical reference is of the static type and the sub-module contains further hierarchical references, then the database retrieves the static hierarchy of the sub-module using processes 720 to 770 (961). If the hierarchical reference is of the dynamic type and the sub-module contains further hierarchical references, then the database retrieves the dynamic hierarchy of the sub-module using processes 820 to 870 (962). Once a certain type of link is followed in the hybrid retrieval process (e.g., if the link is of the static type then hierarchical selection proceeds to static retrieval processes 720 to 770), then any further hierarchical selection and retrieval follows this link type (e.g., because the hierarchical selection proceeds to the static retrieval processes 720 to 770, then if any further hierarchies exist for retrieved sub-modules, the static hierarchy is selected (765)).

The database checks whether a sub-module has been retrieved for each of the sub-components of the component (970). If not, the procedure repeats itself beginning at process 920, until a sub-module for every sub-component has been retrieved. The database transfers or provides to the design team the hybrid version of the module, which includes the hybrid hierarchy including all of the retrieved modules (980). The design team logs out of the database (990).

In the embodiments illustrated in FIGS. 7, 8, and 9, the database retrieves the hierarchies for sub-modules at processes 765, 865, 961, or 962 before retrieving the next sub-module, but other configurations can also be used, e.g., the database can perform this process after some or all of the sub-modules have been retrieved. Also in the embodiments illustrated in FIGS. 7, 8, and 9, the database provides the retrieved hierarchy at processes 780, 880, or 980 after all of the modules have been retrieved, but other configurations can also be used, e.g., the database can provide the modules to the design team immediately upon retrieval.

In the example illustrated in FIG. 5, at time $t_2$, or thereafter, the design team for the product A 110 can have multiple options in choosing which hierarchy of modules to work with, because situations exist where more than one hierarchical reference refers to one or more modules of a sub-component of a component. The design team for the product A 110 could ask the database 400, at process 630, to retrieve the modules for the static version, dynamic version, or hybrid version of the module A v1.0 311.

If the design team selects the static version, flowchart 700 is performed. At process 710, the module A v1.0 311 is retrieved. At process 720, the database checks for any hierarchical reference included in the module A v1.0 311 that refers to a module of the first component $A_1$ 120 of the product A 110. With respect to the database 400, the group 350 of hierarchical references 351 and 352 are found. Since more than one hierarchical reference exists, the process proceeds from process 730 to process 740, wherein the static hierarchical reference 352 is selected. At process 760, the module $A_1$ v1.0 321, which is associated with the module referenced by the static hierarchical reference 352, is retrieved. The database skips process 765, because no sub-modules exist under the module $A_1$ v1.0 321.

At process 770, the database determines that the component $A_2$ 130 of the product A 110 remains to be checked. Returning to process 720, only the static hierarchical reference 353 is found that refers to a module of the component $A_2$ 130. Since only one hierarchical reference exists, the process proceeds from process 730 to process 750, wherein the static hierarchical reference 353 is selected. At process 760, the module $A_2$ v1.0 331, which is associated with the module referenced by the static hierarchical reference 353, is retrieved. At process 765, since the module $A_2$ v1.0 331 references sub-modules, the database retrieves the static hierarchy of the module $A_2$ v1.0 331 separately using processes 720 to 770. In this situation, only one component $A_{2,1}$ 140 exists, which has two modules referenced by the hierarchical references 361 and 362. At process 740, the static hierarchical reference 362 is selected, resulting in the retrieval of the module $A_{2,1}$ v1.0 341. Returning to the retrieval of the static version of the module A v1.0 311, the database has now retrieved the static hierarchy of the module A v1.0 311, which includes the modules A v1.0 311, $A_1$ v1.0 321, $A_2$ v1.0 331, and $A_{2,1}$ v1.0 341. At process 780, the database transfers or provides the static hierarchy to the design team.

If the design team selects the dynamic version, flowchart 800 is performed. At process 810, the module A v1.0 311 is retrieved. At process 820, the database checks for any hierarchical reference included in the module A v1.0 311 that refers to a module of the first component $A_1$ 120 of the product A 110. With respect to the database 400, the group 350 of hierarchical references 351 and 352 are found. Since more than one hierarchical reference exists, the process proceeds from process 830 to process 840, wherein the dynamic hierarchical reference 351 is selected. At process 860, the module $A_1$ v1.1 421, which is associated with the module referenced by the dynamic hierarchical reference 351, is retrieved. The database skips process 865, because no sub-modules exist under the module $A_1$ v1.1 421.

At process 870, the database determines that the component $A_2$ 130 of the product A 110 remains to be checked. Returning to process 820, only the static hierarchical reference 353 is found that refers to a module of the component $A_2$ 130. Since only one hierarchical reference exists, the process proceeds from process 830 to process 850, wherein the static hierarchical reference 353 is selected. At process 860, the module $A_2$ v1.0 331, which is associated with the module referenced by the static hierarchical reference 353, is retrieved. At process 865, since the module $A_2$ v1.0 331 references sub-modules, the database retrieves the dynamic hierarchy of the module $A_2$ v1.0 331 separately using processes 820 to 870. In this situation, only one component $A_{2,1}$ 140 exists, which has two modules referenced by the hierarchical references 361 and 362. At process 840, the dynamic hierarchical reference 361 is selected, resulting in the retrieval of the module $A_{2,1}$ v1.1 441. Returning to the retrieval of the dynamic version of the module A v1.0 311, the database has now retrieved the dynamic hierarchy of the module A v1.0 311, which includes the modules A v1.0 311, $A_1$ v1.1 421, $A_2$ v1.0 331, and $A_{2,1}$ v1.1 441. At process 880, the database transfers or provides the static hierarchy to the design team.

If the design team selects the hybrid version, flowchart 900 will be performed. At process 910, the module A v1.0 311 is retrieved. At process 920, the database checks for any hierarchical reference included in the module A v1.0 311 that refers to a module of the first component $A_1$ 120 of the product A 110. With respect to the database 400, the group 350 of hierarchical references 351 and 352 are found. Since more than one hierarchical reference exists, the process proceeds from process 930 to process 940, wherein the dynamic hierarchical reference 351 is selected because it was the original hierarchical reference defined by the design team that first transferred the module A v1.0 311 to the database. At process 950, the module $A_1$ v1.1 421, which is associated with the module referenced by the dynamic hierarchical reference 351, is retrieved. The database skips processes 960 and 962, because no sub-modules exist under the module $A_1$ v1.1 421. At process 970, the database determines that the component $A_2$ 130 of the product A 110 remains to be checked. Returning to process 920, only the static hierarchical reference 353 is found that refers to a module of the component $A_2$ 130. Since only one hierarchical reference exists, the process proceeds from process 930 to process 945, wherein the static hierarchical reference 353 is selected. At process 950, the module $A_2$ v1.0 331, which is associated with the module referenced by the static hierarchical reference 353, is retrieved. At process 960, the database determines that the hierarchical reference 353 is of a static type and proceeds to process 961. At process 961, since the module $A_2$ v1.0 331 references sub-modules, the process of retrieving the static hierarchy for the module $A_2$ v1.0 331 follows flowchart 700. In this situation, only one component $A_{2,1}$ 140 exists, which has two modules referenced by the hierarchical references 361 and 362. At process 740, the static hierarchical reference 362 is selected, resulting in the retrieval of the module $A_{2,1}$ v1.0 341. Returning to the retrieval of the hybrid version of the module A v1.0 311, the database has now retrieved the hybrid hierarchy of the module A v1.0 311, which includes the modules A v1.0 311, $A_1$ v1.1 421, $A_2$ v1.0 331, and $A_{2,1}$ v1.0 341. At process 980, the database transfers or provides the hybrid hierarchy to the design team.

In the situation that a design team already has a checked-out hierarchy for a particular module, the flowchart 600 allows for the checked-out hierarchy to be updated. At process 650, the design team has the option to request that their hierarchy is updated to include the most up-to-date modules. The currently checked out version is checked for out-of-date sub-modules referenced by a dynamic href (660). The respective up-to-date sub-modules are retrieved (670). An out-of-date hierarchy can exist, for example, in the situation in which a hierarchy is checked- out that includes a sub-module referenced by a dynamic hierarchical reference. If that dynamic hierarchical reference is changed, then the checked-out hierarchy is out-of-date. The dynamic hierarchical reference can be changed if the reference points to a tag that has been changed to refer to a different module, again causing the hierarchy to be out-of-date. The dynamic hierarchical reference can also be changed if the reference points to a module branch that has been recently updated with a new module version. The database can give appropriate notice to design teams with checked-out hierarchies if there is an update or change to their hierarchy. For example, an appropriate notice can be in the form of an automatic email sent to the design team. In one embodiment, the database can allow design teams to register to receive update notices for selected components.

Figure 10:
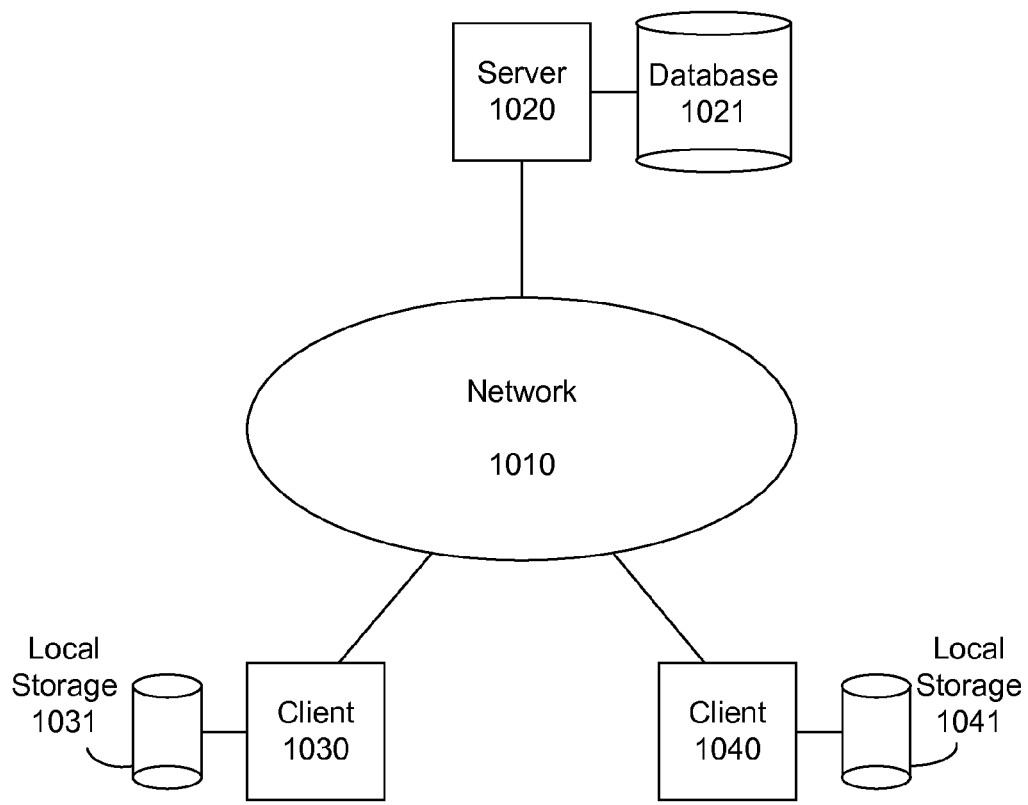
FIG. 10 is a block diagram showing an exemplary network with devices related to managing hierarchies of components.

FIG. 10 depicts a system 1000 that includes an exemplary network and devices related to managing hierarchies of components. The system 1000 includes a database 1021 that is in communication with a server 1020 for communicating over a packet-based network 1010 (e.g., the Internet or an intranet). Design teams can work remotely from the database 1021 at client-stations 1030 or 1040. Each client-station can have a local storage 1031 or 1041, respectively, for storing modules that have been transferred from the database 1021.

From the foregoing, it will be appreciated that the systems and methods provided by the invention afford a simple and effective way to manage hierarchies of components.

The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and the computer program can be deployed in any form, including as a stand-alone program or as a subroutine, element, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and an apparatus can be implemented as, special purpose logic circuitry, e.g., an FPGA (field programmable gate array) or an ASIC (application-specific integrated circuit). Subroutines can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer also includes, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communication, e.g., a communication network. Examples of communication networks include a local area network ("LAN") and a wide area network ("WAN"), e.g., the Internet, and include both wired and wireless networks.

The computing system can include clients and servers. A client and a server are generally remote from each other and typically interact through a communication network. The relationship of client and server arises by virtue of computer programs running on the respective computers and having a client-server relationship to each other.

The invention has been described in terms of particular embodiments. One skilled in the art will realize the invention may be embodied in other specific forms without departing from the spirit or essential characteristics thereof. The foregoing embodiments are therefore to be considered in all respects illustrative rather than limiting of the invention described herein. The alternatives described herein are examples for illustration only and not to limit the alternatives in any way. The steps of the invention can be performed in a different order and still achieve desirable results. Scope of the invention is thus indicated by the appended claims, rather than by the foregoing description, and all changes that come within the meaning and range of equivalency of the claims are therefore intended to be embraced therein.

What is claimed is:

1. A computerized method for managing a hierarchy of modules, the method comprising:
    displaying a user interface that enables a user to select from a first hierarchy tangibly embodied in a machine-readable storage device and a second hierarchy tangibly embodied in a machine-readable storage device, the first hierarchy including a module and a first sub-module, the module including a first hierarchical reference of a first type and a second hierarchical reference of a second type different from the first type, the module being associated with a component, the first sub-module being associated with a first sub-component of the component, the module being associated with the first sub-module using the first hierarchical reference, the second hierarchy including the module and a second sub-module, the second sub-module being associated with the first sub-component, the module being associated with the second sub-module using the second hierarchical reference;
    receiving, from a computer input device, a request from the user indicative of the first hierarchy or the second hierarchy; and
    providing the first hierarchy or the second hierarchy to the user based on the request.

2. The method of claim 1, wherein the first and the second sub-modules are the same.

3. The method of claim 1, wherein the first and the second sub-modules are different.

4. The method of claim 1, wherein the first type of the first hierarchical reference comprises a static type and the second type of the second hierarchical reference comprises a dynamic type.

5. The method of claim 4, wherein the first hierarchical reference has a fixed association with the first sub-module.

6. The method of claim 5, wherein the fixed association is with a particular version number of the component.

7. The method of claim 4, wherein the second hierarchical reference has a changeable association with the second sub-module.

8. The method of claim 7, wherein the changeable association is with a changeable tag.

9. The method of claim 8, wherein the changeable tag is associated with the second sub-module.

10. The method of claim 8, wherein the changeable tag is associated with a branch, the branch comprising the first and the second sub-module.

11. The method of claim 10, wherein the first and the second sub-modules are different, the first sub-module created at a time earlier than the second sub-module.

12. The method of claim 7, wherein the changeable association is with a branch, the branch comprising the second sub-module.

13. The method of claim 12, wherein the first and the second sub-modules are different, the first sub-module created at a time earlier than the second sub-module.

14. The method of claim 4, further comprising providing the first hierarchy when the request is indicative of a static version of the module.

15. The method of claim 14, wherein the first hierarchy further includes a static version of the first sub-module.

16. The method of claim 14, the first hierarchy further including a static version of the first sub-module and a static version of a third sub-module, the third sub-module associated with a second sub-component different from the first sub-component, the module being associated with the third sub-module using a third hierarchical reference of a static or a dynamic type.

17. The method of claim 4, further comprising providing the second hierarchy when the request is indicative of a dynamic version of the module.

18. The method of claim 17, the second hierarchy further including a dynamic version of the second sub-module.

19. The method of claim 17, the second hierarchy further including a dynamic version of the second sub-module and a dynamic version of a third sub-module, the third sub-module associated with a second sub-component different from the first sub-component, the module being associated with the third sub-module using a third hierarchical reference of a static or a dynamic type.

20. The method of claim 4, wherein the second hierarchy further includes a third sub-module, the third sub-module associated with a second subcomponent different from the first sub-component, the module being associated with the third sub-module using a third hierarchical reference of a third type, the method further comprising providing the second hierarchy when the request is indicative of a hybrid version of the module, the second hierarchy further including a dynamic version of the second sub-module and a version of the third type of the third sub-module.

21. The method of claim 20, wherein the third type is a static type or a dynamic type.

22. The method of claim 1, wherein the module comprises files, data, or source code.

23. A system for managing a hierarchy of modules, the system comprising:
    a computer database tangibly embodied in a machine-readable storage device including a first hierarchy of modules and a second hierarchy of modules, the first hierarchy including a module and a first sub-module, the module including a first hierarchical reference of a first type and a second hierarchical reference of a second type different from the first type, the module being associated with a component, the first submodule being associated with a first sub-component of the component, the module being associated with the first sub-module using the first hierarchical reference, the second hierarchy including the module and a second sub-module, the second sub-module being associated with the first sub-component, the module being associated with the second sub-module using the second hierarchical reference,
    the computer database adapted to provide a user with a selection of the first hierarchy and the second hierarchy;
    the computer database adapted to receive a request from a client over a network for selecting the first or the second hierarchy of modules,
    the computer database adapted to transfer the first or the second hierarchy of modules to the client over the network based on the request.

24. A computer program product, tangibly embodied in a machine-readable storage device, the computer program product including instructions being operable to cause a data processing apparatus to:

provide a user with a selection of a first hierarchy of modules and a second hierarchy of modules, the first hierarchy including a module and a first sub-module, the module including a first hierarchical reference of a first type and a second hierarchical reference of a second type different from the first type, the module being associated with a component, the first sub-module being associated with a first sub-component of the component, the module being associated with the first sub-module using the first hierarchical reference, the second hierarchy including the module and a second sub-module, the second sub-module being associated with the first sub-component, the module being associated with the second sub-module using the second hierarchical reference;

receive a request from the user indicative of the first hierarchy or the second hierarchy; and provide the first hierarchy or the second hierarchy to the user based on the request.

* * * * *